United States Patent [19]

Hayashi et al.

[11] Patent Number: 5,014,196
[45] Date of Patent: May 7, 1991

[54] VECTOR OPERATION INSTRUCTION ACTIVATION CONTROLLER FOR VECTOR ARITHMETIC UNITS HAVING ARITHMETIC FUNCTIONS WITH DIFFERENT NUMBERS OF PIPELINE STAGES

[75] Inventors: Hideo Hayashi, Tokyo; Makoto Omata, Yamanashi, both of Japan

[73] Assignee: NEC Corporation, Tokyo, Japan

[21] Appl. No.: 316,962

[22] Filed: Feb. 28, 1989

[30] Foreign Application Priority Data

Mar. 4, 1988 [JP] Japan ................... 63-50755

[51] Int. Cl.[5] ...................... G06F 9/38; G06F 15/347
[52] U.S. Cl. ............................. 364/200; 364/232.21; 364/231.8; 364/736
[58] Field of Search ... 364/200 MS File, 900 MS File, 364/736, 730, 569, 748

[56] References Cited

U.S. PATENT DOCUMENTS

| | | | |
|---|---|---|---|
| 3,989,374 | 11/1976 | Latka et al. | 355/69 |
| 4,128,880 | 12/1978 | Cray, Jr. et al. | 364/200 |
| 4,639,886 | 1/1987 | Hashimoto et al. | 364/736 |
| 4,761,753 | 8/1988 | Izumisawa | 364/736 |
| 4,789,925 | 12/1988 | Lahti | 364/730 |
| 4,849,926 | 7/1989 | Hasegawa | 364/900 |
| 4,884,190 | 11/1989 | Ngai et al. | 364/200 |
| 4,888,682 | 12/1989 | Ngai et al. | 364/200 |
| 4,933,893 | 6/1990 | Maeda | 364/736 |
| 4,967,343 | 10/1990 | Ngai et al. | 364/736 |

Primary Examiner—Michael R. Fleming
Assistant Examiner—Gopal C. Ray
Attorney, Agent, or Firm—Foley & Lardner

[57] ABSTRACT

A vector operation instruction issue control method includes a meter for measuring an elapse of a time period corresponding to a sum of the number of vector elements of a vector operation instruction and a difference between the number of pipeline stages of two arithmetic functions. When a vector operation instruction using an arithmetic function having a larger number of pipeline stages is issued to a vector arithmetic unit, the meter is activated to measure a time period corresponding to a sum of the number of vector elements of the vector operation instruction and the stage number difference. When a vector operation instruction using an arithmetic function having a smaller number of pipeline stages is issued subsequently to the vector operation instruction using the arithmetic function having the larger number of pipeline steps, the vector operation instruction using the arithmetic function having the smaller number of pipeline stages is issued in accordance with an end timing of the measurement of the meter.

5 Claims, 5 Drawing Sheets

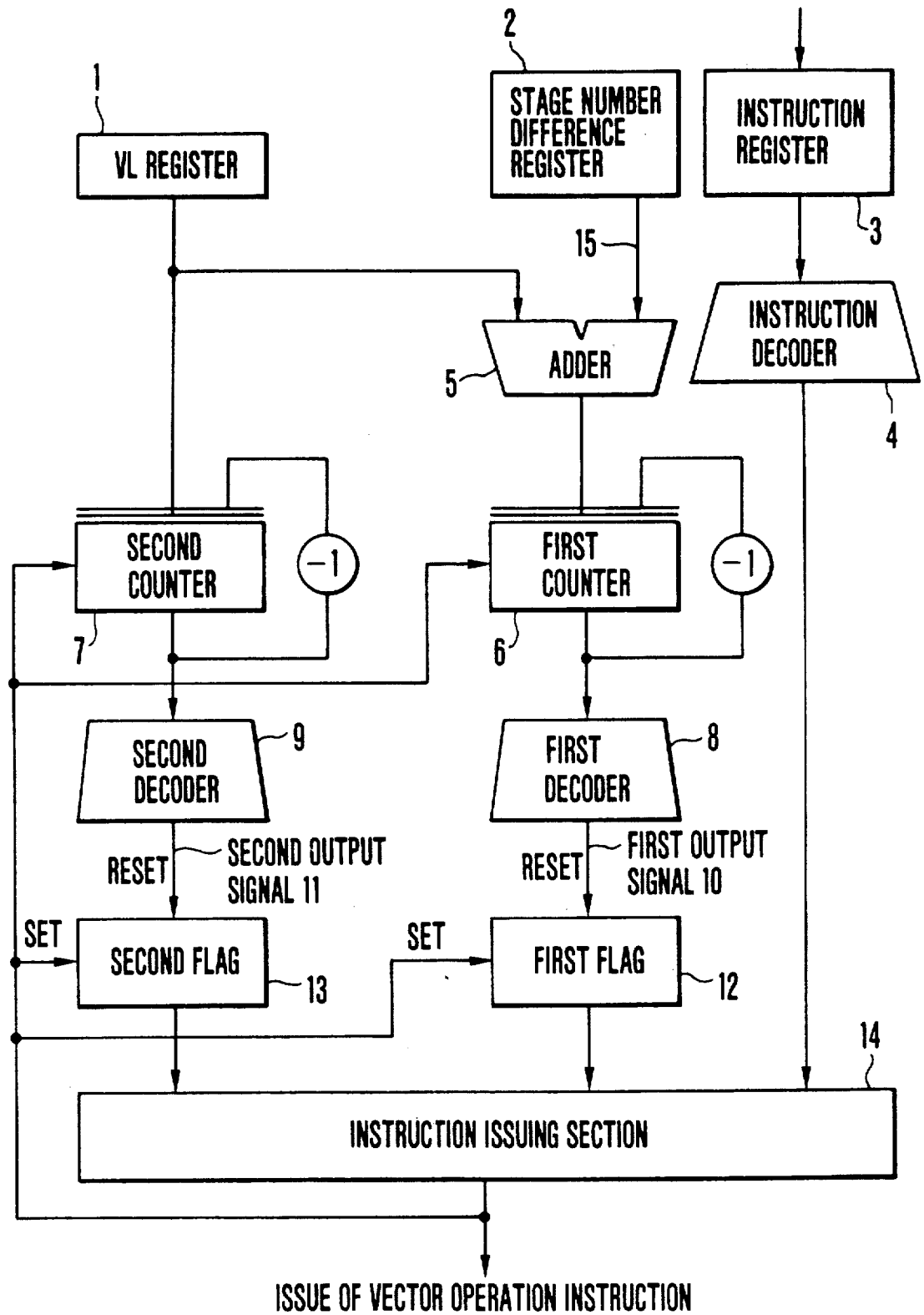
F I G. 1

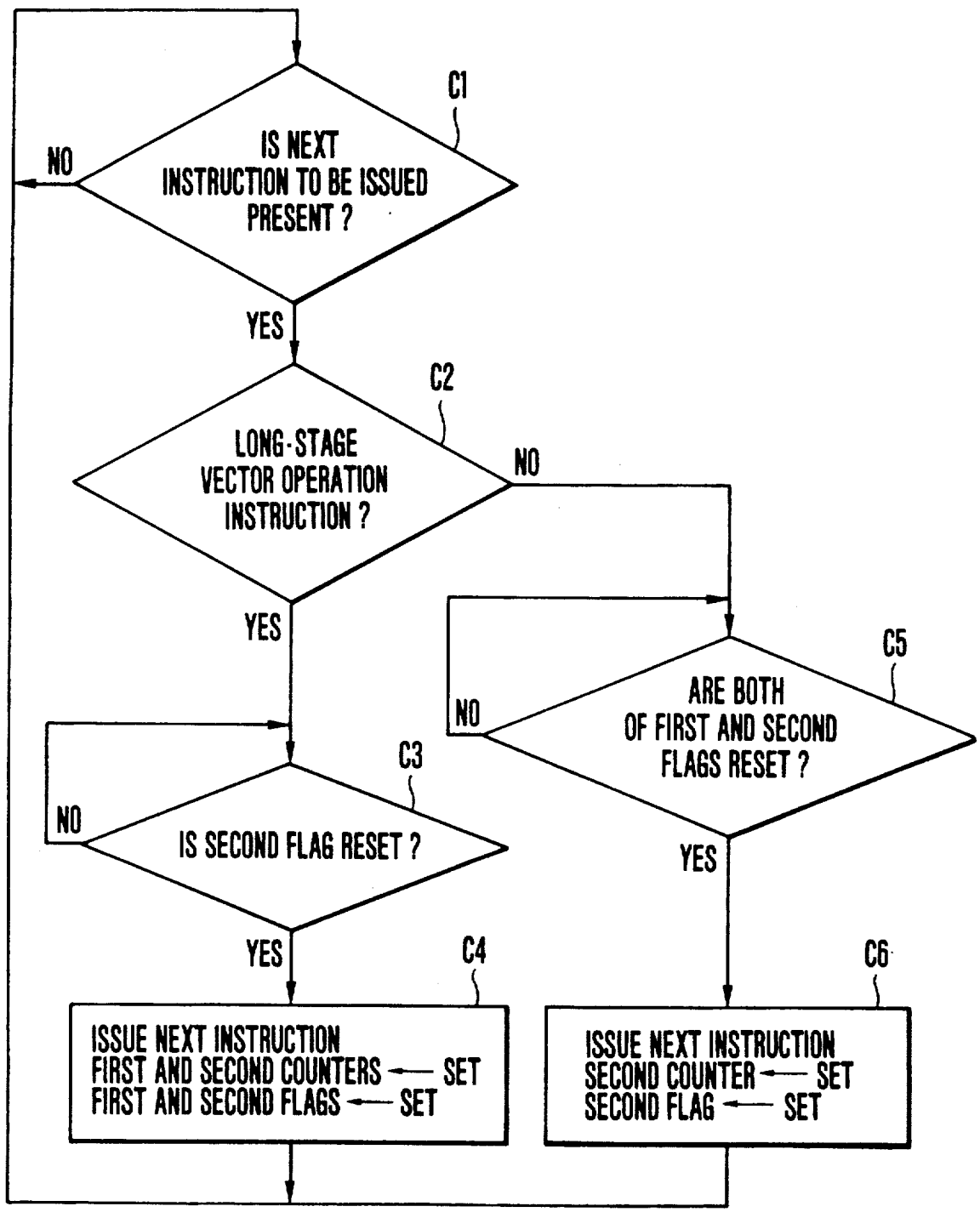
F I G. 2

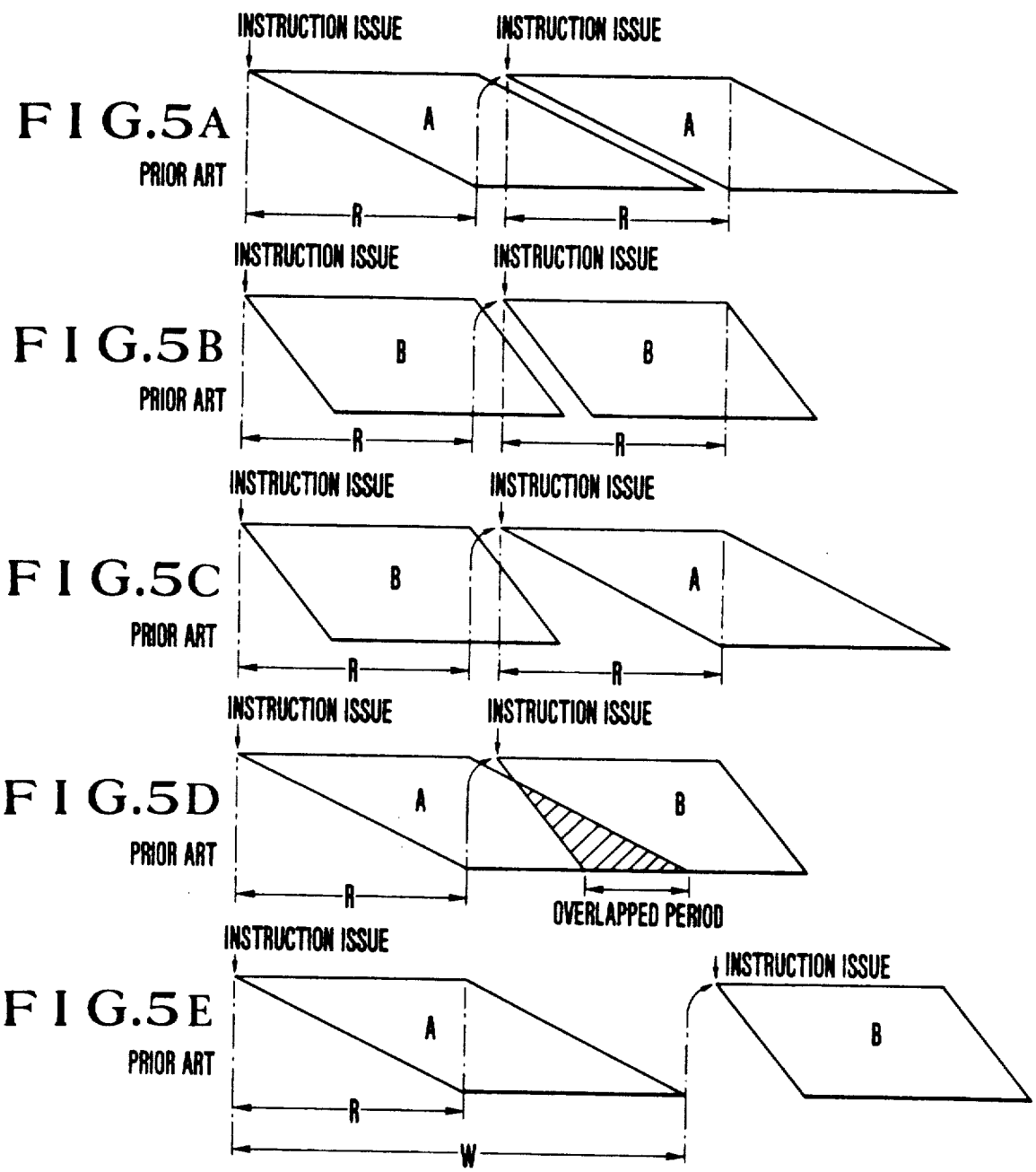

5,014,196

VECTOR OPERATION INSTRUCTION ACTIVATION CONTROLLER FOR VECTOR ARITHMETIC UNITS HAVING ARITHMETIC FUNCTIONS WITH DIFFERENT NUMBERS OF PIPELINE STAGES

BACKGROUND OF THE INVENTION

The present invention relates to a vector operation instruction issue control method for a vector processing apparatus and, more particularly, to a vector operation instruction issue control method for activating a vector operation instruction in a vector arithmetic unit including two arithmetic functions having different numbers of pipeline stages.

In a vector processing apparatus for successively supplying vector data held in a vector register to a vector arithmetic unit and executing a vector operation at high speed by so-called pipelining, a single arithmetic unit is conventionally allowed to have two arithmetic functions with different number of pipeline stages (to be referred to as simply stages hereinafter) and execute two types of operations.

FIGS. 4A to 4C are views for explaining an operation of such a vector arithmetic unit. In FIG. 4A, a vector arithmetic unit 40 has an arithmetic function with a large number of stages (e.g., five stages for the sake of simplicity of the following description) and that with a small number of stages (e.g., two stages for the sake of simplicity of the following description). Upon activation, the arithmetic unit 40 performs an arithmetic function of the externally designated type. Assume that a vector element number (VL) is "5" and that the vector arithmetic unit 40 is caused to execute a vector operation instruction using the arithmetic function of five stages (to be referred to as a long-stage vector operation instruction A hereinafter) and to execute a vector operation instruction using the arithmetic function of two stages (to be referred to as a short-stage vector operation instruction B hereinafter).

FIG. 4B is a schematic timing chart for explaining an operation executed when the long-stage vector operation instruction A is issued to the vector arithmetic unit 40. When the long-stage vector operation instruction A is issued, a first element el to a fifth element e5 of vector data held in vector registers 41 are successively supplied to the vector arithmetic unit 40. Each element passes through five stages S1 to S5 in the vector arithmetic unit 40 to perform a predetermined operation, and the result is stored in the vector registers 41 again. A time period from reading of the first to fifth elements el to e5 from the vector registers 41 to completion of inputting thereof in the vector arithmetic unit 40 corresponds to vector register reading (R), and that from reading of the first element el from the vector registers 41 to writing of an operation result of the fifth element e5 therein corresponds to vector register writing (W).

FIG. 4C is a schematic timing chart for explaining an operation executed when the short-stage vector operation instruction B is issued to the vector arithmetic unit 40. Assume that the short-stage vector operation instruction B is to be executed by using the first and fifth stages S1 and S5 of the above five stages S1 to S5. In this case, when the short-stage vector operation instruction B is issued, the vector data elements el to e5 successively supplied from the vector registers 41 to the vector arithmetic unit 40 pass through the first and fifth stages S1 and S5 to perform predetermined operations, and the results are stored in the vector registers 41 again. The period of the vector register reading (R) of the short-stage vector operation instruction B is the same as that of the long-stage vector operation instruction A, but the period of its vector register writing (W) is shorter than that of the long-stage vector operation instruction A because the number of stages is small.

As described above, in the vector arithmetic unit having the two arithmetic functions with different number of stages, the vector writing (W) period, i.e., a period during which data stays in the vector arithmetic unit 40 differs between execution of the long-stage vector operation instruction A and that of the short-stage vector operation instruction B. Therefore, in order to successively issue vector operation instructions, issue timings must be determined in consideration of the numbers of stages to be used by each two successive vector operation instructions. Such vector operation instruction issue timing control is conventionally performed as follows.

When vector operation instructions having the same number of stages are to be successively issued or when a preceding instruction is the short-stage vector operation instruction B and a subsequent instruction is the long-stage vector operation instruction A, immediately after the vector register reading (R) period of the preceding vector operation instruction has elapsed, the subsequent vector operation instruction is issued. For this purpose, a flag representing the vector register reading (R) is used to control issue of the subsequent vector operation instruction. FIGS. 5A, 5B and 5C are timing charts for explaining this control.

Assuming that the preceding instruction is the long-stage vector operation instruction A and the subsequent instruction is the short-stage vector operation instruction B, if issue is controlled by the above vector register reading flag, data to be processed by the preceding instruction overlaps that to be processed by the subsequent instruction in the vector arithmetic unit 40 as shown in FIG. 5D. Therefore, in a conventional method, a flag representing the vector register writing (W) is used to control issue of the subsequent short-stage vector operation instruction B.

As described above, in the conventional vector operation instruction issue control method, if a preceding instruction is the long-stage vector operation A and a subsequent instruction is the short-stage vector operation instruction B, issue of the subsequent short-stage vector operation instruction B is controlled by the vector register writing flag. Therefore, the subsequent short-stage vector operation instruction B is issued after an operation of the vector arithmetic unit 40 according to the long-stage vector operation instruction A is completely finished. For this reason, an unnecessary empty time is produced between the long- and short-stage vector operation instructions A and B.

SUMMARY OF THE INVENTION

It is, therefore, an object of the present invention to provide a vector operation instruction issue control method not producing an unnecessary empty time.

In order to achieve the above object of the present invention, there is provided a vector operation instruction issue control method of activating a vector operation instruction in a vector arithmetic unit including two arithmetic functions having different number of pipeline stages, comprising a meter for measuring an elapse of a time period corresponding to a sum of the number of vector elements of a vector operation instruction and a difference between the number of pipeline stages of the two arithmetic functions, wherein when a vector operation instruction using an arithmetic function having a larger number of pipeline stages is issued to the vector arithmetic unit, the meter is activated to measure a time period corresponding to a sum of the number of vector elements of the vector operation instruction and the stage number difference, and when a vector operation instruction using an arithmetic function having a smaller number of pipeline stages is issued subsequently to the vector operation instruction using the arithmetic function having the larger number of pipeline steps, the vector operation instruction using the arithmetic function having the smaller number of pipeline stages is issued in accordance with an end timing of the measurement of the meter.

BRIEF DESCRIPTION OF THE DRAWINGS

FIG. 1 is a block diagram showing an embodiment of the present invention;

FIG. 2 is a flow chart for explaining the processing of an instruction issuing section 14;

FIGS. 5A, 5B, 5C, 5D and 5E are timing charts for explaining operations of a conventional method.

DETAILED DESCRIPTION OF THE PREFERRED EMBODIMENTS

Figure 3A:
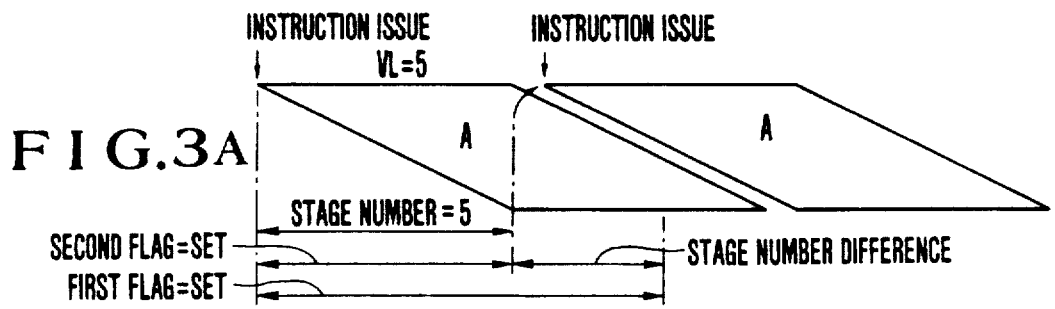
FIGS. 3A, 3B, 3C and 3D are timing charts for explaining operations of the embodiment of the present invention.

An embodiment of the present invention will be described below with reference to the accompanying drawings.

Referring to FIG. 1, the embodiment of the present invention comprises a VL register 1 for holding the number of vector elements (VL) of a vector operation instruction to be issued next, a stage number difference register 2 for holding a difference between the number of stages of two arithmetic functions of a vector arithmetic unit, an instruction register 3 for holding a vector operation instruction to be executed (issued) next, an instruction decoder 4 for decoding the vector operation instruction held in the instruction register 3, an adder 5 for adding the vector element number held in the VL register 1 with stage number difference data 15 output from the stage number difference register 2, a first counter 6 for counting down upon each predetermined time period after the sum of the adder 5 is set, a second counter 7 for counting down upon each predetermined time period after the vector element number held in the VL register 1 is set, a first decoder 8 for checking whether the count of the first counter 6 reaches a predetermined value, e.g., 0, a second decoder 9 for checking whether the count of the second counter 7 reaches a predetermined value, e.g., 0, a first flag 12 to be reset by a first output signal 10 from the first decoder 8, a second flag 13 to be reset by a second output signal 11 from the second decoder 9, and an instruction issuing section 14. On the basis of the decoding result of the instruction decoder 4 and the states of the first and second flags 12 and 13, the instruction issuing section 14 checks whether issue of a vector operation instruction is possible. If the issue is determined to be possible, the instruction issuing section 14 issues the vector operation instruction and at the same time sets the first and second counters 6 and 7 and the first and second flags 12 and 13. The control of the instruction issuing section 14 is shown in FIG. 2.

Figure 3B:
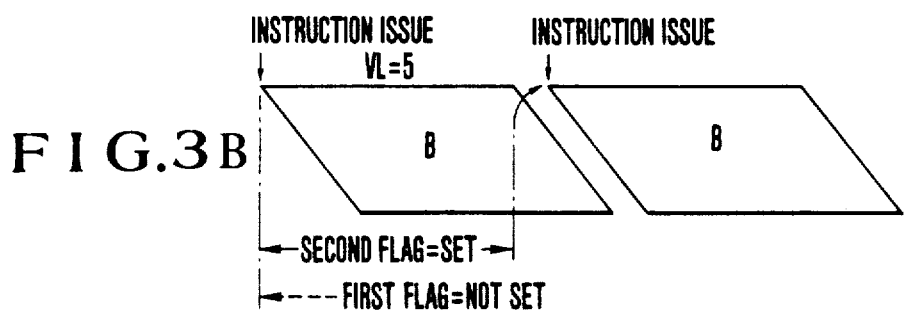
Figure 3C:
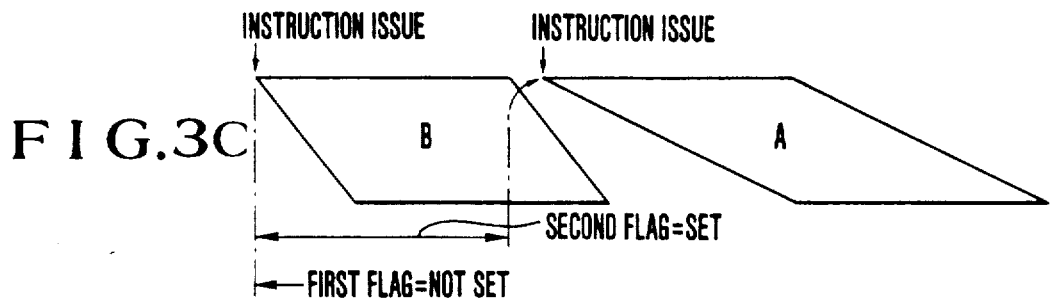
Figure 3D:
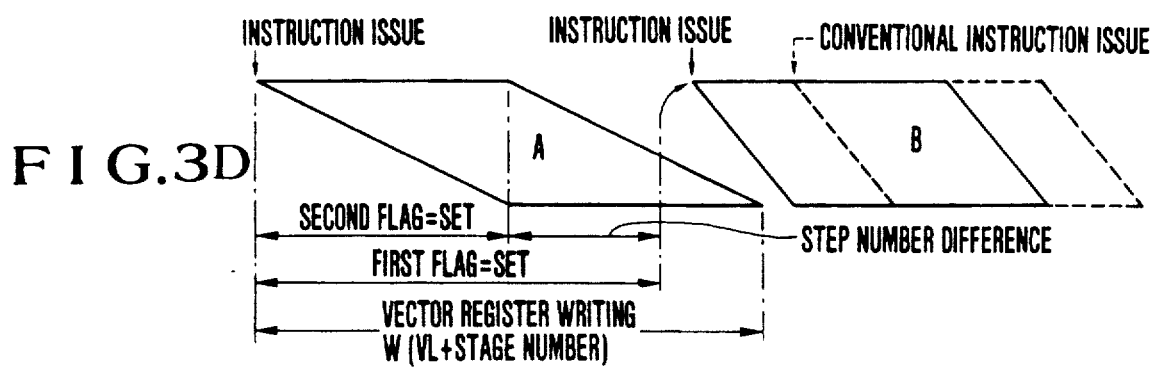
Figure 4A:
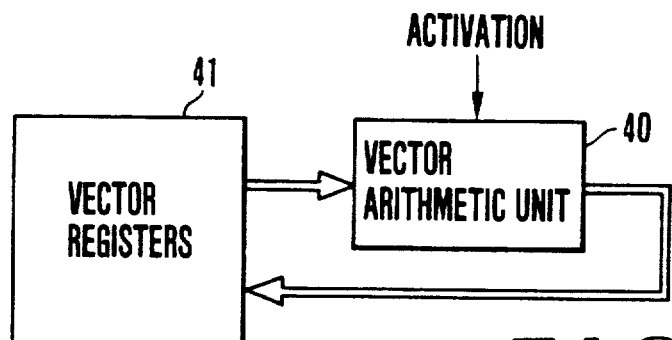
FIGS. 4A, 4B and 4C are views for explaining a vector arithmetic unit having two arithmetic functions with different number of stages.
Figure 4B:
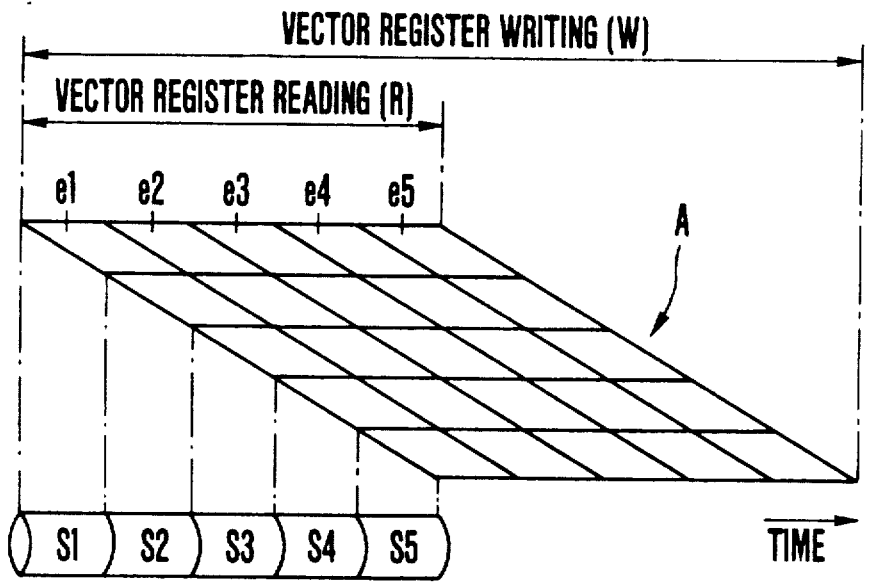
Figure 4C:
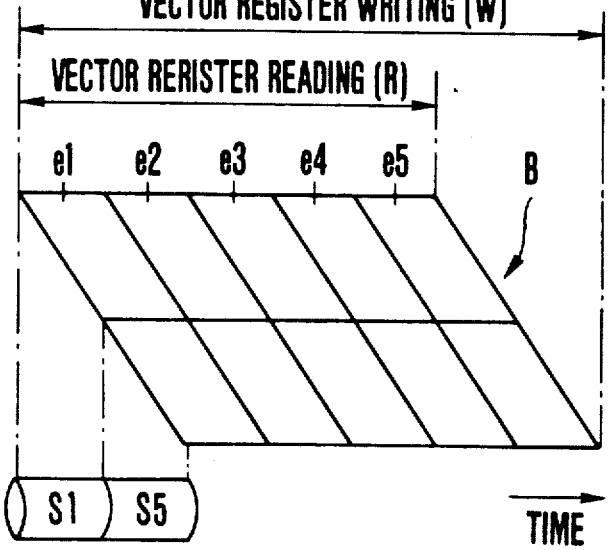

FIGS. 3A to 3D are timing charts for explaining operations to be executed when the vector operation instruction issue control method of the present invention is applied to the vector arithmetic unit 40 shown in FIGS. 4A to 4C. More specifically, FIG. 3A corresponds to an operation to be executed when the long-stage vector operation instructions A are successively issued; FIG. 3B, an operation to be executed when the short-stage vector operation instructions B are successively issued; FIG. 3C, an operation to be executed when the short- and long-stage vector operation instructions B and A are issued in the order named; and FIG. 3D, an operation to be executed when the long- and short-stage vector operation instructions A and B are issued in the order named.

The operations of the embodiment of the present invention will be described below with reference to accompanying drawings. For example, assume that the number of stages of an arithmetic function of the vector arithmetic unit for executing the long-stage vector operation instruction A is "5", that for the short-stage vector operation instruction B is "2", and the vector element number (VL) is "5".

Operation in FIG. 3A

When the vector arithmetic unit finishes its operation, both of the first and second flags 12 and 13 shown in FIG. 1 are reset.

When the long-stage vector operation instructions A are to be successively issued as shown in FIG. 3A, the first long-stage vector operation instruction A is stored in the instruction register 3, and its vector element number "5" is set in the VL register 1. The stage number difference "3" is stored beforehand in the stage number difference register 2.

When the instruction issuing section 14 recognizes in step C1 of FIG. 2 that an instruction to be issued next is present, it checks in step C2, on the basis of the decoding result of the instruction decoder 4, whether the instruction to be executed next is the long-stage vector operation instruction A. If the next instruction is the long-stage vector operation instruction A, the flow advances to step C3. If the next instruction is the short-stage vector operation instruction A, the flow advances to step C5. In this case, since the next instruction is the long-stage vector operation instruction A, the instruction issuing section 14 checks in step C3 whether the second flag 13 is reset. If the second flag 13 is reset, the instruction issuing section 14 issues the next instruction, i.e., the first long-stage vector operation instruction A (step C4). At the same time, the instruction issuing section 14 sets the first and second counters 6 and 7 such that the sum "8" of the adder 5 is stored in the first counter 6 and the vector element number "5" held in the VL register 1 is stored in the second counter 7, and sets the first and second flags 12 and 13 (step C4). In response to the issue of the long-stage vector operation instruction A, vector data are successively supplied from the vector registers to the vector arithmetic unit, and predetermined operations are executed by the five stages. Simultaneously, the content of each of the first and second counters 6 and 7 is decremented by one upon each predetermined time period, e.g., a processing time per element of the vector data.

After the first long-stage vector operation instruction A is issued, the long-stage vector operation instruction A to be issued next is stored in the instruction register 3, and its vector element number "5" is stored in the VL register 1. When the instruction issuing section 14 recognizes in step C1 of FIG. 2 that the instruction to be issued next is present, it determines in step C2 that the next instruction is the long-stage vector operation instruction A and waits in step C3 until the second flag 13 is reset. When the second flag 13 is reset, the instruction issuing section 14 issues the next long-stage vector operation instruction A (step C4).

As described above, the vector element number "5" of the first long-stage vector operation instruction A is set as an initial value in the second counter 7 and decremented upon each predetermined time period. A time interval corresponding to the vector element number "5" corresponds to the vector register reading (R) period corresponding to the first long-stage vector operation instruction A. Therefore, when the content of the second counter 7 becomes 0, the vector register reading (R) period has elapsed. The count "0" in the second counter 7 is detected by the second decoder 9, and at this timing the second flag 13 is reset. Therefore, the next long-stage vector operation instruction A issued in step C4 after the second flag 13 is reset in step C3 is issued immediately after the vector register reading (R) period (the same as a period during which the second flag 13 is set) corresponding to the preceding long-stage vector operation instruction A has elapsed.

Operation in FIG. 3B

When the short-stage vector operation instructions B are to be successively issued as shown in FIG. 3B, the first short-stage vector operation instruction B is stored in the instruction register 3, and its vector element number "5" is set in the VL register 1.

When the instruction issuing section 14 recognizes in step C2 that the instruction to be executed next is the short-stage vector operation instruction B, the flow advances to step C5. If both of the first and second flags 12 and 13 are reset in step C5, the instruction issuing section 14 issues the first short-stage vector operation instruction (step C6). At the same time, the instruction issuing section 14 sets the second counter 7 such that the vector element number "5" held in the VL register 1 is stored in the second counter 7, and sets the second flag 13 (step C6). In this case, neither of the first counter 6 nor the first flag 12 are set.

In response to the issued short-stage vector operation instruction B, vector data are successively supplied from the vector registers to the vector arithmetic unit to execute predetermined operations by the two stages, and at the same time the content of the second counter 7 is decremented by one upon each predetermined time period.

After the instruction issuing section 14 issues the first short-stage vector operation instruction B, it waits in step C5, in accordance with the decoding result of the short-stage vector operation instruction B to be issued next and which is stored in the instruction register 3, until both of the first and second flags 12 and 13 are reset. When both of the first and second flags 12 and 13 are reset, the instruction issuing section 14 issues the next short-stage vector operation instruction B (step C6). In this case, the first flag 12 is originally reset because it is not set upon issue of the preceding short-stage vector operation instruction B, and the second flag 13 is reset by the second decoder 9 when the vector element number "5" of the first short-stage vector operation instruction B is decremented to be "0", i.e., when the vector register reading period corresponding to the first short-stage vector operation instruction B has elapsed. Therefore, as shown in FIG. 3B, the next short-stage vector operation instruction B is issued immediately after the vector register reading period (the same as a period during which the second flag 13 is set) corresponding to the preceding short-stage vector operation instruction B has elapsed. Operation in FIG. 3C When the short- and long-stage vector operation instructions B and A are successively issued in the order named as shown in FIG. 3C, if the instruction issuing section 14 recognizes in step C2 that the instruction to be executed next is the short-stage vector operation instruction B, the flow advances to step C5. In step C5, if both of the first and second flags 12 and 13 are reset, the instruction issuing section 14 issues the first short-stage vector operation instruction B (step C6). At the same time, the instruction issuing section 14 sets the second counter 7 such that the vector element number "5" of the short-stage vector operation instruction B held in the VL register 1 is stored in the second counter 7, and sets the second flag 13 (step C6).

In response to the issued short-stage vector operation instruction B, vector data are successively supplied from the vector registers to the vector arithmetic unit to perform predetermined operations by the two stages, and at the same time the content of the second counter 7 are decremented upon each predetermined time period.

After the instruction issuing section 14 issues the first short-stage vector operation instruction, it waits in step C3, in accordance with the decoding result of the long-stage vector operation instruction A to be issued next stored in the instruction register 3, until the second flag 13 is reset. When the second flag is reset, the instruction issuing section 14 issues the next long-stage vector operation instruction A (step C4). In this case, the second flag 13 is reset by the second decoder 9 when the vector element number "5" of the first short-stage vector operation instruction B set in the second counter 7 is decremented to be "0", i.e., when the vector register reading period corresponding to the first short-stage vector operation instruction B has elapsed. Therefore, as shown in FIG. 3C, the next long-stage vector operation instruction A is issued immediately after the vector register reading period (the same as a period during which the second flag 13 is set) corresponding to the preceding short-stage vector operation instruction B has elapsed. Operation in FIG. 3D When the long- and short-stage vector operation instructions A and B are to be successively issued in the order named as shown in FIG. 3D, if the instruction issuing section 14 recognizes in step C2 that the instruction to be issued next is the long-stage vector operation instruction A, the flow advances to step C3. In step C3, if the second flag 13 is reset, the instruction issuing section 14 issues the first long-stage vector operation instruction A. At the same time, the instruction issuing section 14 sets the first and second counters 6 and 7 such that the sum "8" of the adder 5 is stored in the first counter 6 and the vector element number "5" held in the VL register 1 is stored in the second counter 7, and sets the first and second flags 12 and 13 (step C4).

In response to the issued long-stage vector operation instruction A, vector data are successively supplied from the vector registers to the vector arithmetic unit to perform predetermined operations by the five stages, and at the same time the contents of the first and second counters 6 and 7 are decremented upon each predetermined time period.

After the instruction issuing section 14 issues the first long-stage vector operation instruction A, it waits in step C5, in accordance with the decoding result of the short-stage vector operation B to be issued next stored in the instruction register 3, until both of the first and second flags 12 and 13 are reset. When both of the first and second flags 12 and 13 are reset, the instruction issuing section 14 issues the next short-stage vector operation instruction B (step C6). In this case, the second flag 13 is reset when the vector register reading period corresponding to the first long-stage vector operation instruction A has elapsed. The first flag 12, however, is not reset at this time but is reset by the first decoder 8 when a time period corresponding to a stage number difference "3" has elapsed. Therefore, both of the flags 12 and 13 are reset from a timing earlier by a time period corresponding to two stages than an end timing of the vector register writing (W) period corresponding to the first long-stage vector operation instruction A, as shown in FIG. 3D. That is, as shown in FIG. 3D, the next short-stage vector operation instruction B is issued at a timing earlier by the time period corresponding to two stages than the end timing of the vector register writing (W) corresponding to the preceding long-stage vector operation instruction A.

On the contrary, in the conventional method using a vector register writing flag, the subsequent short-stage vector operation instruction B is issued at a timing indicated by a broken line in FIG. 3D. Therefore, an unnecessary empty time is produced between the preceding long-stage vector operation instruction A and the subsequent short-stage vector operation instruction B.

As has been described above, according to the present invention, in order to successively issue long- and short-stage vector operation instructions in the order named in a vector arithmetic unit including two arithmetic functions having different numbers of stages, the subsequent short-stage vector operation instruction is issued when a vector register reading period of the vector arithmetic unit corresponding to the preceding long-stage vector operation instruction has elapsed and a time period corresponding to a difference between the numbers of stages used by the above two arithmetic functions has elapsed. Therefore, since the subsequent vector operation instruction can be issued at an earliest timing not producing data overlap portion in the vector arithmetic unit, no unnecessary empty time is produced between the execution timings of the vector operation instructions. As a result, the performance of a vector processing apparatus can be improved.

What is claimed is:

1. A vector operation instruction issue control method for activating a vector operation instruction in a vector arithmetic unit including two arithmetic functions having different number of pipeline stages, comprising the steps of:

measuring, using a first counter, a first time period corresponding to a sum of both a number of vector elements of a vector operation instruction and a difference between the number of pipeline stages of the two arithmetic functions, measuring, using a second counter, a second time period corresponding to the number of vector elements of the vector operation instruction whenever the vector operation is issued;

simultaneously activating said first and second counters whenever a vector operation instruction using an arithmetic function having a larger number of pipeline stages is issued to said vector arithmetic until; and activating said second counter whenever a vector operation instruction using an arithmetic function having a smaller number of pipeline stages is issued, said vector operation instruction being activated in said vector arithmetic unit whenever at least one of said first and second counters measures said first and second time period respectively.

2. A vector operation instruction issue controller for continuously activating a vector operation instruction in a vector arithmetic unit including two arithmetic functions each having a different number of pipeline stages comprising:

a first counter for setting a sum of a number of vector elements of the vector operation instruction and a difference between the number of pipeline stages of said two arithmetic functions whenever the vector operation instruction using the one of said two arithmetic functions having a larger number of pipeline stages is issued, and then for counting down, in accordance with each machine cycle, said sum to zero;

a second counter for setting the number of vector elements of the vector operation instruction whenever the vector operation instruction is issued, and then for counting down said number of vector elements to zero in accordance with each machine cycle;

wherein whenever the vector operation instruction using the arithmetic function having the larger number of pipeline stages is issued to said vector arithmetic unit, said first and second counters are simultaneously activated, wherein the vector operation instruction using the arithmetic function having a shorter number of pipeline stages is issued to said arithmetic unit, only said second counter is activated, and wherein said vector operation instruction is activated in said vector arithmetic unit whenever at least one of said first and second counters counts down to zero.

3. A vector operation instruction issue controller according to claim 2, wherein whenever the vector operation instruction using the arithmetic function having the shorter number of pipeline stages is issued to said vector arithmetic unit following a previous vector operation instruction using the arithmetic function having the larger number of pipeline stages, said vector operation instruction is issued at completion of countdown of said first and second counters.

4. A vector operation instruction issue controller according to claim 2, wherein whenever the vector operation instruction using the arithmetic function having the larger number of pipeline stages is issued to said vector arithmetic unit following a previous vector operation instruction using the arithmetic function having the larger number of pipeline stages, the vector operation instruction is issued at completion of countdown of said second counter.

5. A vector operation instruction issue controller according to claim 2, wherein whenever the vector operation instruction is issued to said vector arithmetic unit following a previous vector operation instruction using the arithmetic function having the shorter number of pipeline stages, the vector operation instruction is issued at completion of countdown of said second counter irrespective of numbers of pipeline stages in the vector operation instruction.

* * * * *